United States Patent [19]
Hendy

[11] Patent Number: 5,008,352
[45] Date of Patent: Apr. 16, 1991

[54] SUBSTITUTED AROMATIC POLYMERS

[75] Inventor: Brian N. Hendy, Middlesborough, England

[73] Assignee: Imperial Chemical Industries PLC, London, England

[21] Appl. No.: 307,563

[22] Filed: Feb. 8, 1989

[30] Foreign Application Priority Data

Feb. 8, 1988 [GB] United Kingdom ............... 8802796
Feb. 8, 1988 [GB] United Kingdom ............... 8802797

[51] Int. Cl.$^5$ ...................... C08G 75/23; C08G 65/48
[52] U.S. Cl. .............................. 525/534; 210/500.25; 210/500.41; 210/630; 210/639; 210/654; 528/128
[58] Field of Search ............ 528/125, 126, 128; 525/389, 534, 471; 210/500.25, 500.41, 638, 639, 654; 562/830

[56] References Cited

U.S. PATENT DOCUMENTS

| | | | |
|---|---|---|---|
| 2,888,486 | 5/1959 | Gregory | 562/830 |
| 3,647,086 | 3/1972 | Mizutani et al. | 521/27 |
| 4,256,862 | 3/1981 | Binsack et al. | 525/534 |
| 4,268,650 | 5/1981 | Rose | 525/534 |
| 4,508,852 | 4/1985 | Bikson et al. | 525/534 |

FOREIGN PATENT DOCUMENTS 0112725  4/1984  European Pat. Off. .
2090843  7/1982  United Kingdom .

*Primary Examiner*—Veronica P. Hoke
*Attorney, Agent, or Firm*—Cushman, Darby & Cushman

[57] ABSTRACT

An aryl-ether and/or thioether polymer contains aromatic rings linked to neighboring units Ph X Ph (when Ph is paraphenylene and X is $SO_2$ and/or CO) through O and/or S and/or a direct link, at least some of said aromatic rings carrying a nuclear suphonamide group having N-aliphatic substitution, preferably with a cationic amino or quaternary ammonium group.

A process for making aromatic polymer sulphonyl halides and, thus also sulphonamides, of very low sulphonic acid content, is characterized by working up in substantially anhydrous conditions the mixture resulting from the reaction of an inorganic halide with the corresponding sulphonic acid or salt thereof. The polymer sulphonamides are suitable for separation technologies, especially purification of water by reverse osmosis.

15 Claims, No Drawings

SUBSTITUTED AROMATIC POLYMERS

This invention relates to substituted aromatic polymers, in particular containing sulphonyl halide or cationic or cation-forming side chains, and to a process for making them.

EP-A 0008894 describes a hydrophilic sulphonated polymer derived by controllably sulphonating a polymer having repeat units

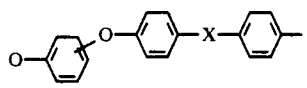

(where X is SO$_2$) and

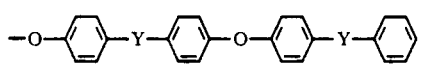

(where Y is SO$_2$), substantially all units I being sulphonated and substantially all units II unsulphonated.

EP-A 0008895 describes related polymers in which X is CO. EP-A 0041780 describes related polymers in which X and Y are both CO.

In each of such polymers the aromatic rings in subunits III:

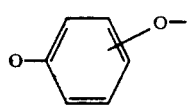

normally undergo monosulphonation if the ether linkages are mutually ortho or para, disulphonation if the ether linkages are mutually meta. A range of sulphonated polymers having differing sulphonate contents can be made by choosing the relative proportions of units I and II in the polymer subjected to sulphonation. When X is CO, sulphonation takes place more slowly and can be to some extent controlled in conventional ways, such as by time and temperature.

The process of making aromatic sulphonyl halides commonly involves reacting the corresponding sulphonic acid or salt with an inorganic acid halide and drowning the raw reaction product in cold water or crushed ice. We have found that this process when applied to polymeric sulphonic acids tends to give products still containing a significant proportion of SO$_3$H groups.

GB-A-2090843 describes an arylethersulphone copolymer having nuclear substituent groups SO$_2$X (where X is inter alia halogen or NHR, R being H or aryl). EP-A-112725 describes an arylethersulphone polymer having nuclear substituents SO$_2$Cl and a method of making it involving contact with isopropanol and water.

We have discovered a new series of aromatic polymer sulphonamides. We have also devised a process by which a usefully higher proportion of sulphonyl halide groups, and thus of derivatives such as sulphonamides and esters, can be obtained.

The invention in its first aspect provides an arylether and/or arylthioether polymer, having aromatic rings linked to neighbouring rings in its chain through O and/or S and/or a direct link, at least some of said aromatic rings carrying at least one nuclear substituent sulphonamide group SO$_2$NR'R", where R' is an aliphatic unsubstituted or substituted hydrocarbon group and R" is an aliphatic unsubstituted or substituted hydrocarbon group or hydrogen, said neighbouring rings being part of repeating units PhXPh where Ph is paraphenylene and X is SO$_2$ and/or CO and being present in a molar proportion at least equal to that of said aromatic rings.

In each case the aliphatic hydrocarbon group can carry one or more substituents such as aryl, hydroxy, alkoxy, aryloxy, thiol, alkylthio, arylthio, amino, alkylamino or arylamino. Such an alkylamino substituent may be the group —G—N—R$_n$"" as defined below.

In the substituent group, any aliphatic hydrocarbon group or substituted hydrocarbon group has typically up to 20, especially up to 6 carbon atoms per R' or R". If R' and R" are both such, they may be joined to form a ring, as in pyrrolidine or piperidine or morpholine, by carbon—carbon bonds or through substituents. If any are aliphatic hydrocarbon group carries a hydroxy and/or alkoxy substituent it preferably contains 2–3 carbon atoms per oxygen and up to 6 carbon atoms in total. Thus substituents having interlinear oxygen such as oligoethyleneoxide and oligopropyleneoxide (oligo=2 to 4) are very suitable.

The invention in its second aspect provides such a polyarylether and/or thioether having nuclear substituent groups SO$_2$N(R''')—G—N—R$_n$"", where R''' and R"" are H or unsubstituted or substituted hydrocarbon, n is 2 or 3 and G is a direct link or alkylene up to C$_{20}$ or arylene.

In the substituent group SO$_2$ NR'''—G—NR$_n$"":
R''' is H, alkyl (especially up to 6 carbon atoms) or aryl (especially phenyl or halophenyl) or —G—NR"";
G is preferably alkylene (including a methylene residue and up 10 to 6 carbon atoms possibly with interlinear oxygen) or phenylene
R"" is H, alkyl (especially up to 6 carbon atoms) or aryl (especially phenyl or halophenyl);
when n is 3, the outer N carries a positive charge;
when n is 2, the outer N is uncharged;
(Such a positive charge is associated with an anion as will be described hereinafter);
when n is 2 or 3, the 2 or 3 groups R"" may be joined to form a ring, as in pyrrolidine or piperidine or quinuclidine;
when R''' and at least one group R"" are alkyl, alkenyl or aryl, these groups may be joined to form a ring, as in 1,4-piperazine, or in a residue of an amino substituted nitrogen heterocycle such as pyridine or pyrimidine.

If R''' and/or R"" carry a substituent group, that group may be as defined for R" and R".

When the outer N carries a positive charge, the anion associated with it can be for example any one of the common strong acid anions such as halide, sulphate, nitrate, hydrogen phosphate or organic sulphonate, or a weak acid anion such as carboxylate, carbonate, sulphite, sulphide or third dissociation phosphate. The anions can be interchanged readily by contacting the polymer with appropriate salt solutions. If the polymer contains SO$_3$H groups as well as cationic groups, these SO$_3$H groups can provide the anions. The polymer is then a zwitterion and each of its molecules will carry a charge whose sign and net magnitude depends on the acidity or alkalinity of the solution surrounding it. It can, in particular, exhibit an isoelectric point at a pH at which the basic and acidic groups most nearly neutralise one another.

The polyarylether carrying the substituent groups preferably contains units I, and the said sub-units can carry one or two such groups according to the mutual disposition of the ether linkages. Linkages X can be all $SO_2$ or all CO or partly $SO_2$, partly CO.

Depending on its intended use, the polyarylether may also contain units II. The percentage molar proportion of units I to (I and II) is suitably at least 1 and typically 5–75 for an ultrafiltration membrane, and 50–100 for a membrane for reverse osmosis or ion exchange. Whereas the polyarylether may contain units other than I and II, it preferably contains units I and II in major proportion, especially over 90%, and preferably consists of those units. The linkages Y can be all $SO_2$ or all CO or partly $SO_2$ and partly CO.

The content of said aromatic rings such as sub-units III carrying the said substituent groups is conveniently over 70, especially at least 85, suitably substantially 100, mole percent of those rings present. Usually the lower percentages are more readily obtained when linkages Y is CO.

The nuclear-substituted polyarylether can be made by reacting a suitable corresponding sulphonic acid derivative with an appropriate amine. Most conveniently the derivative is an acid halide. The reaction is carried out preferably in a solvent, which is preferably polar, but effectively inert, for example an aromatic nitro compound, suitably nitrobenzene. A basic compound can be present to take up hydrogen halide if the sulphonic acid derivative is a halide. The basic compound is conveniently an excess of the reactant amine or is a tertiary amine or a suitable inorganic reagent.

For making the polymer according to the first aspect of the invention the amine is for example a primary or secondary ethylamine, alkanolamine, butylamine, alkoxyethylamine at C5-6 cyclic secondary amine.

For making the polymer according to the second aspect of the invention the amine is a diamine; suitably it is tertiary or quaternary at one end of its molecule and primary or secondary at the other end, so that cross-linking of polymer molecules does not readily take place. More specific examples of diamines are alpha (alkyl) amino-omega-dialkylamino-alkanes, where the alkene residue of the alkane (which corresponds to group G) has 2–6 carbon atoms and is linear or (where possible) branched, and the alkyl groups have 2–4 carbon atoms which are linear or (where possible) branched and may carry an OH or alkoxy group. Examples are:

1-amino-2-dimethylaminopropane
1-methylamino-2-dimethylaminoethane
1-amino-3-oxa-5-dimethylaminopentane
1-amino-2-dimethylaminoethane
hydrazine, semicarbazide
guanidine, biguanide
dialkylaminoanilines for example 4-dimethylaminoaniline
aminopyridines
aminopyrimidines If the amine reactant is not already quaternary on one of its nitrogen atoms, the polymer sulphonamide may be quaternised by reaction with an alkyl ester of a strong acid, for example an alkyl halide or sulphate. This step can be applied to the reaction product of the sulphonyl halide and amine without isolating the polymer sulphonamide. In another route to the substituted polyaryl ether the corresponding sulphonic acid or derivative is reacted with a monoamine carrying a reactive group such as halogen or hydroxy, and the product of that reaction is reacted with a mono-amine. The said monoamine may be a tertiary amine for example trimethylamine or pyridine, to give a quaternary amine in one step, or else a subsequent quaternisation may be carried out.

According to the third aspect of the invention a polymer carries a plurality of groups $SO_2Z$ where Z is halogen or N R' R", where R' and R" are as hereinbefore defined, and possibly also groups $SO_2OM$ (where M is 1/m of a cation of valency m) and is characterised in that by moles the groups $SO_2Z$ are at least 90%, especially at least 95%, of the total of $SO_2Z$ and $SO_2OM$. The cation is for example hydrogen, ammonium, alkylammonium, alkali metal or alkaline earth metal. (The free sulphonic acid is assumed to be fully ionised.)

The substituted polyarylether is soluble in organic liquids such as DMSO and DMF and mixtures thereof. It can be fabricated into membranes for example by solvent casting or extrusion.

The weight average molecular weight of the arylether and thioether polymers of the invention, in terms of the corresponding parent polymer before introduction of the sulphonic acid groups, can be for example from about 2000 up to the limit dictated by viscosity too high to permit ready handling. For the above-mentioned polyarylether-sulphones and ketones it is typically in the range 5000 to 100,000, especially 25,000 to 60,000. These molecular weights correspond to reduced viscosities (RV) (lg polymer per 100 cm$^3$ of solution) in the range 0.25 to 2.0, especially 0.5 to 1.5 for parent polymer. The RV of a polymer according to the invention is typically greater than that of its parent and in general is in the range 0.25 to 4.0, especially 0.5 to 2.5. The molecular weight can be expressed alternatively as a polymerisation number, typically over 5 and in the range 12 to 250, especially 60–150.

According to the fourth aspect of the invention a process for making a polymer carrying a plurality of groups $SO_2Z'$ (where Z' is halogen) comprises reacting a corresponding polymer carrying groups $SO_2OM$ with an inorganic acid halide and working up the product of that reaction by contacting the reaction mixture with a liquid and is characterised by maintaining substantially water-free conditions during working up. The starting polymer can carry sulphonic groups wholly in $SO_2OM$ form or can contain $SO_2Z'$ groups, for example as the product of a previous reaction with inorganic acid halide in which reaction the conversion to the $SO_2Z'$ compound was incomplete, possibly as the result of working up in presence of water.

For this process cation M is preferably monovalent, most conveniently hydrogen.

The product of the fourth aspect process can be thereafter reacted with an amine corresponding to the group NR'R". Such reaction is carried out preferably in a solvent which is preferably polar but effectively inert, for example an aromatic nitro-compound suitably nitrobenzene. A basic compound can be present to take up the hydrogen halide formed in the reaction. The basic compound is conveniently an excess of the reactant amine or is a tertiary amine or a suitable inorganic reagent.

The polymer carrying groups $SO_2Z$ or $SO_2Z'$ or $SO_2OM$ can be for example a polyalkene, polystyrene, polyarylether, polyaryl thioether, or (especially) a polyarylether-sulphone or -ketone or -sulphone/ketone copolymer.

The invention in its third and fourth aspects is especially applicable to the above-mentioned polyarylethers and polyarylthioethers, particularly polyarylethersulphones and polyaryletherketones and mixed sulphone-ketones of that genus, in which the polymeric chain contains readily sulphonatable aromatic rings free of deactivating groups. Examples of those rings are phenylene with 2 ether or thioether links, biphenylene with 2 ether or thioether links on the same or different benzene rings as mentioned above and also bis phenyl alkanes.

In making the polymer sulphonyl halide the inorganic acid halide can be for example $POCl_3$, $PCl_3$, or phosgene. Conveniently a thionyl halide, especially chloride, is used. Preferably the inorganic halide is in excess; thionyl chloride also serves as the reaction solvent, especially when the starting polymer is in free acid form. A weak tertiary organic base, typically no stronger than aniline, is preferably present. Examples are pyridine, alkylpyridines and guinolines. Very suitably the base contains oxygen, which may be present as part of an electron-withdrawing group, especially acyl. The quantity of the base is for example 60 to 200 especially 100–120 mole calculated on the $SO_2OM$ groups of the starting polymer. Examples are dialkylamides of aliphatic carboxylic acids containing up to 6 carbon atoms in all. Such bases are preferably liquids at ambient temperature. A convenient base is dimethylformamide or dimethylacetamide. In such amide bases each nitrogen is considered to contribute 1 mole of basic function. It appears that the base forms a complex with the acid halides present.

After reaction with the inorganic acid halide, the reaction mixture is worked up by contacting it with a liquid in which the polymer sulphonyl halide is insoluble but unwanted materials are soluble. This can be cold water but according to the fourth aspect of the invention is preferably a substantially water-free organic liquid. The volume of such liquid is at least double that of the reaction mixture and preferably is sufficient to afford a dilution factor (total weight divided by weight of starting polymer) of at least 1000 especially at least 5000. This ensures that unwanted materials, in particular residues of the organic base, which might attract water vapour from the atmosphere and/or promote a side reaction with sulphonyl halide groups leading to $SO_2OH$ group formation, are removed. In particular it is important to ensure that the organic base is at a very low level or indeed absent once the inorganic halide and the hydrogen halide byproduct have been removed. This is because such base, which catalyses the reaction of the inorganic halide, is also a catalyst for the reaction of the polymer sulphonyl halide with water. Therefore also contacting with the liquid is effected preferably with vigorous agitation.

The organic liquid should not significantly dissolve the polymer sulphonyl halide, but should dissolve any inorganic acid halide left over after reaction, the inorganic products of reaction, and also the base added as catalyst. A suitable liquid is a C1–C6 oxygenated hydrocarbon, such as an alcohol preferably secondary or tertiary; although it is capable of reaction with the polymer sulphonyl halide, this reaction is too slow to be significant at temperatures under about 15° C. Preferably more than one organic liquid is used, and they are chosen so as to be mutually soluble. A suitable combination is an alcohol, especially propanol, for the first contacting stage(s), followed by a volatile hydrocarbon or halogenated hydrocarbon (bp 30° up to 140° C.) for subsequent stage(s), in which the alcohol is removed; the second liquid should not, of course, dissolve or swell the polymer.

The sulphonyl halide can be isolated from the last wash stage by drying. If the polymer consists essentially of units I and II carrying $SO_2Z'$ but no more than the stated level of $SO_2OM$, it shows the characteristic property of solubility in tetrachloroethane at preferred low $SO_2OM$ contents. Nitrobenzene is a suitable solvent for the generality of the polymer sulphonyl halides provided by the fourth aspect of the invention. The polymers are also soluble in polar organic liquids such as DMSO and DMF and mixtures thereof. They can be fabricated into membranes for example by solvent casting.

In preferred polymer sulphonyl halides, the content of halide can be over 99% and substantially 100%, by moles of the total of sulphonylhalide and sulphonic acid. Corresponding percentages are obtained of the sulphonamide-substituted polyarylethers according to the invention. These constitute preferred forms of the invention in view of their high cation content. Membranes formed from the polyarylethersulphonamide are, to differing extents depending on the number and structure of the substituents, hydrophilic. They are suitable for separation technologies such as ion-exchange, reverse osmosis and ultrafiltration. Since they are at lease partly cationic, unlike polyarylethersulphonic acid membranes, their range of utility can complement that of those acids. Membranes formed from the polyarylether sulphonyl halide are hydrophobic but, being reactive, they can be rendered hydrophilic and are then suitable for separation technologies such as ion-exchange, reverse osmosis and ultrafiltration. Either membrane can be a single layer, possibly asymmetric or can be in combination with a membrane of differing porosity or polarity. The single or combination membrane can be supported mechanically by a porous polymer film and/or a fibrous and/or mesh layer. Whether or not so supported, the membranes show advantageous mechanical strength.

The invention in its fifth aspect provides a process of producing purified water which comprises contacting water containing dissolved impurity with one side of a membrane comprising a cationic sulphonamide-substituted polymer according to the invention, applying to the impurity-containing water a hydrostatic pressure in excess of the osmotic pressure of that solution, and recovering purified water from the other side of that membrane.

In the following Examples the following test procedures were used:

RV (reduced viscosity) was measured at 25° C. on a solution of 1 g of polymer in 100 cm³ of solution. The solvent was DMF unless otherwise stated;

Specific resistance was calculated from the resistance of two bodies of 0.5 molar sodium chloride separated by a membrane of known thickness.

The initials ICE represent 1,1,1-trichloroethane.

EXAMPLE 1

(a) Polyarylether (51.16 g, 0.13% mol of $SO_3H$) consisting of unit I ($X=SO_2$) with para-linked sub-units (III), each sub-unit carrying an $SO_3H$ group, as produced by sulphonation of polymer of RV 0.5, was added to a stirred mixture of thionyl chloride (420 g) and DMF (8 ml) at 50° C. and stirred until the polymer dissolved (ca 4 h). The resulting clear yellow brown solution was held at 50° C. for 5 h, then filtered into 1500 ml of ice-cold isopropanol with very vigorous agitation. The resulting precipitate was collected on a filter, rinsed twice with isopropanol, then twice with 60°-80° C. petroleum ether and 3 times with 40°-60° C. petroleum ether. It was then sucked dry and dried overnight in vacuo at 85° C. From the analysis of the amide described below it was evident that the sulphonyl chloride content was over 95% of the possible content thereof. The polymer sulphonyl chloride was readily soluble in tetrachloroethane.

(b) In a flow of nitrogen a sample of polyarylethersulphonyl chloride so formed (52.27 g, 0.12 mol) was added to dry nitrobenzene (335 ml) and the mixture was stirred and heated to 50° C. until almost all the solid had dissolved. The solution was filtered to remove any traces of undissolved sulphonyl chloride, then fed over 20 min into a solution of 1-amino-3-dimethylaminopropane (70 ml) in DMF (380 ml). The mixture was held at 40° C. for 3 h. The resulting mixture was run into 3000 ml of isopropanol. The precipitate was collected on a filter, washed successively with isopropanol, then with dilute sulphuric acid to remove untreated diamine, then converted to free base by slurrying with aqueous sodium hydroxide and washed with water and isopropanol and dried as in (a). The free base had RV 0.70 in DMF; this is to be compared with 2.04 for the sulphonic acid in DMF. By NMR ('H, 13-C) it appeared to contain under about 5% of its sulphonyl groups as acid. (In repeat batches the acid content was less then 1% and, indeed, at or below the limit of detection by NMR).

(c) To a sample of free base polymer from (b) (44.89 g, 0.092 mol) dissolved in DMSO (380 ml) was added a solution of methyl iodide (75 g, 0.53 mol). The mixture was held at 50° C. for 5 h, then run out into TCE. The precipitate was slurried in cold water, then in hot water, then washed 4 times with isopropanol, sucked dry and dried as in (a). The resulting polyarylethersulphone sulphonylaminopropyltrimethylammonium iodide had RV 1.75 and a specific resistivity of 88 ohm cm. (d) The procedure of Example 1(b) was repeated to the end of the heating at 40° C. for 3 h using a sample of polymer sulphonyl chloride containing less than 1 mol percent of sulphonic acid and fully soluble in tetrachloroethane. Then a solution of methyl iodide in DMSO of the same concentration as in 1 (c) but in greater quantity by a factor of 2.34 was added. The mixture was heated and worked up as in 1(c). The product was the same as that of 1(c) except for being coarser-grained and easier to handle. Its RV was 2.27.

EXAMPLE 2

A sample of the polyarylethersulphonyl chloride from Example 1 (16 g, 37.84 mmole) was trickled into a stirred solution of monoethanolamine (12.2 g, 200 mmole) and the mixture was cooled to 20° C. The hydroxy ethylamide product was precipitated by addition of isopropanol, collected on a filter, washed with petroleum ether and dried.

The following sulphonamides were made by a similar procedure:

| diethyl | RV 0.74 | acid content 8% |
| Methoxyethyl | RV 0.62 | acid content 8% |
| tert-butyl | RV 0.82 | acid content 5% |
| piperidine | RV 0.55 | acid content very low |

EXAMPLE 3

(a) Polyarylether (50.02 g) consisting of units I and II ($X=Y=SO_2$) in the molar ratio 57:43 each with para-linked sub-units III, each sub-unit III carrying one $SO_3H$ group, as produced by sulphonation of polymer having RV 0.51, was added to a stirred mixture of thionyl chloride (712 g) and DMF (8 ml) at 50° C. and stirred until the polymer dissolved and then overnight. The product was added with vigorous stirring to 5 times its volume of isopropanol at 5°-10° C. The resulting precipitate was collected on a filter, washed twice with isopropanol, twice re-slurried with 60°-80° C. petroleum ether, twice filter-washed with 40°-60° C. petroleum ether, then dried in vacuo at 85° C. The yield of product soluble in tetrachloroethane was 86%.

(b) A sample of polyarylethersulphonyl chloride so formed (13.7 g) was added to nitrobenzene (140 g) at 50° C. and stirred until dissolved (30 min). The solution was filtered and under nitrogen added to a solution of 1-methylamino-2-dimethylamino-ethane (3.69 g, 0.036 mol) in DMF (100 ml) with cooling to keep the temperature at about 20° C. The mixture was stirred for 2.5 h. To it was added a solution of methyl iodide (50.1 g, 0.35 mol) in dimethylsulphoxide (60 ml). The resulting mixture was stirred at 50° C. for 5 h, then at ambient temperature overnight. The product was dripped into TCE with stirring to precipitate the polymer sulphonylmethylaminoethyltrimethylammonium iodide. The precipitate was collected on a filter, twice reslurried in ICE, collected again on a filter, then washed with cold water, hot water and isopropanol, and finally dried overnight at 80° C. in vacuo.

The iodide had RV 0.94 in DMF. By NMR ('H, 13-C) it appeared to contain less than 5% of its sulphonic groups as acid. Its specific resistivity was 35606 ohm cm.

EXAMPLE 4

(a) Polyarylether (120 g, 0.363 mol) consisting of units I and II ($X=Y=SO_2$) with para-linked sub-units in the mol ratio 57:43, each dioxyphenylene sub-unit in units I carrying an $SO_3H$ group, as produced by sulphonation of polymer having RV 0.51, was added to a stirred mixture of thionyl chloride (2000 g, 16.698 mol) and DMF (24 ml, 0.312 mol) at 50° C. and stirred until the polymer dissolved (ca 4 h). The resulting mixture was held at 50° C. for 5 h, then filtered into 5 times its volume of isopropanol at 5°-10° C. with very vigorous agitation. The resulting precipitate was collected on a filter, washed 4 times with isopropanol, then 4 times with petroleum ether, dried in vacuo at 60° C. overnight, then at 90° C. for 0.75 h. Yield 115.08 g, 92.9%. The product was readily soluble in tetrachloroethane.

(b) A sample of polyarylethersulphonyl chloride so formed (100.0 g, 293 mmole) in solution in nitrobenzene (645 ml) was added slowly to a solution of 1-amino-3-dimethylamino-propane (164 ml, 1.318 mol) in DMF (715 ml) with cooling to keep the temperature at about 20° C. The mixture was held at 40° C. for 2.5 h. The resulting mixture was run into isopropanol to precipitate the polymer sulphonylaminopropyldimethylamine hydrochloride. The precipitate was collected on a filter, washed 4 times with isopropanol, washed with water, washed with dilute sulphuric acid to remove unreacted diamine, then washed again with water converted to free base by washing with aqueous NaOH and finally washed with water and isopropanol. It was dried at 80° C. in vacuo overnight. Yield 93.74 g, 84.5%. The free base had RV 0.40 in DMF. By NMR ('H 13-C) it appeared to contain a very low percentage of its sulphonic groups as acid.

(c) To a sample of free base from (b) dissolved in DMSO (240 ml) was added methyl iodide (19.9 g) in DMSO (70 ml). The mixture was heated at 50° C. for 3 h, then cooled and dripped into ICE. The resulting precipitate was collected on a filler, re-slurried twice with ICE, filtered and washed with cold water, hot water and isopropanol. It was dried at 80° C. in vacuo overnight. The product had RV 1.02 and specific resistance 801 ohm cm.

EXAMPLE 5

The starting polyarylether was made by stirring a solution of a polyaryletherketone (200 g) consisting of repeating units I (X=CO, para ether linkages) in 98% sulphuric acid at 50° C. for 6 days, then drowning the solution in water. The polymer sulphonic acid precipitated as beads, these were washed with cold water until heavily swollen, then dissolved in water, filtered, ion-exchanged with Amberlite (RIM) resin (OH form). The solution was evaporated to a film (225 g, yield 88%) RV 1.73.

(a) Polyarylether (28.3 g) consisting of units I (X=CO) with paralinked sub-units, each sub-unit III carrying one $SO_3H$ group, from the above preparation was added to a stirred mixture of thionyl chloride (500 g) and LMF (8 ml) and stirred at 50° C. until the polymer dissolved and then for 5 h. The product was added with vigorous stirring to 5 times its volume of ice-cold isopropanol. The resulting precipitate was collected on a filter, washed with isopropanol, then 5 with 60°-80° C. petroleum ether, re-slurried twice with 40°-60° C. petroleum ether, then dried in vacuo at 80° C.

The yield of product soluble in tetrachloroethane was 26.7 g, 90%.

(b) A sample of polyarylethersulphonyl chloride so formed (13.0 g) was added over 45 min to nitrobenzene (180 g) at 25° and stirred until dissolved (30 min). The solution was filtered into a pressure-equalised dropping funnel and under nitrogen added dropwise to a solution of 1-amino-3-dimethylaminopropane (49 g) in DMF (150 ml). The mixture was stirred at 40° C. for 3 h. To it was added a solution of methyl iodide (52 g) in dimethylsulphoxide (60 ml). The resulting mixture was stirred at 50° C. for 5 h. The product was dripped into ICE with stirring to precipitate the polymer sulphonylaminopropyltrimethylammonium iodide. The precipitate was collected on a filter, twice reslurried in ICE, collected again on a filter, then washed with cold water, hot water and isopropanol, and finally dried overnight at 80° C. in vacuo, Yield 14.9 g, 70%.

(c) A sample of the same polyarylethersulphonyl chloride (7.2 g) was added over 45 min to nitrobenzene (60 g) at 25° and stirred until dissolved (30 min). The solution was filtered into a pressure-equalised dropping funnel and under nitrogen added dropwise to a solution of 1-methylamino-2-dimethylaminoethane (2.5 g) in DMF (100 ml). The mixture was stirred at 40° C. for 3 h. To it was added a solution of methyl iodide (12 g) in dimethylsulphoxide (50 ml). The resulting mixture was stirred at 50° C. for 5 h. The product was dripped into TCE with stirring to precipitate the polymer sulphonylmethylaminoethyltrimethylammonium iodide. The precipitate was collected on a filter, then washed with cold water, hot water and isopropanol, and finally dried overnight at 80° C. in vacuo. Yield 7.5 g, 70%.

EXAMPLE 6

Water purification by reverse osmosis

Polymer prepared in Example 1 (d) (12 g) was dissolved in DMF (18 g). The solution was filtered through a 50 micron filter and centrifuged for 30 min at 3000 rpm. A bead of the solution was poured onto a clean dry glass plate and spread to a thickness of 500 microns using a knife blade. The plate was dried in an oven at 100° C. for 16 h. The resulting polymer film was found to have an average thickness of 65 microns.

A sample of the film was cut and placed in a reverse osmosis test cell. A solution of 0.2 wt % sodium chloride was passed over the surface of the film at 25° C. and under 600 psi applied pressure. After 24 h, the film was found to have a salt rejection of 98.4% and permeability of $1.877 \times 10^{-18}$ $m^2/s/Pa$. A second piece of film, cut from the same sample, was similarly tested and found to have a salt rejection of 98.2% and permeability of $1.209 \times 10^{-18}$ $m^2/s/Pa$.

EXAMPLE 7

Water purificiation by reverse osmosis

Polymer prepared in Example 3(b) (3 g) was dissolved in DMF (7 g). The solution was filtered through a 50 micron filter and centrifuged for 30 minutes at 3000 rpm. A bead of the solution was poured onto a clean dry glass plate and spread to a thickness of 250 microns using a knife blade. The polymer film had an average thickness of 41 microns after drying at 100° C. for 16 h. A sample of the film was cut and placed in a reverse osmosis test cell. A solution of 0.2 wt % sodium chloride was passed over the surface of the film at 25° C. and under 500 psi applied pressure. After 24 h, the film was found to have a salt rejection of 96.3% and permeability of $2.733 \times 10^{-19}$ $m^2/s/Pa$.

I claim:

1. An aryl-ether polymer having aromatic rings linked to neighbouring rings in its chain through O and/or a direct link, at least some of said aromatic rings carrying a nuclear substituent sulphonamide group $SO_2NR'R''$, where R' is an aliphatic unsubstituted or substituted hydrocarbon group and R'' is hydrogen or an unsubstituted or substituted aliphatic hydrocarbon group, said neighbouring rings being part of repeating units Ph X Ph, where Ph is paraphenylene and X is $SO_2$ and/or CO, and being present in a molar proportion at least equal to that of said aromatic rings, said aryl-ether polymer being derived from a corresponding polymer carrying a plurality of groups $SO_2Z$, where Z is halogen, and possibly also groups $SO_2OM$, where M is 1/m of a cation of valency m, and being characterized in that said aryl-ether polymer contains, by moles, 0 to 10% of groups $SO_2OM$, based on the total groups $SO_2OM$ and $SO_2NR'R''$.

2. An aryl-ether polymer having aromatic rings linked to neighbouring rings in its chain through O, or direct link, at least some of said aromatic rings carrying a nuclear substituent sulphonamide group

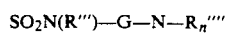

$SO_2N(R''')—G—N—R_n''''$ where
R'''' and R''''' are hydrogen or unsubstituted or substituted hydrocarbon and may be the same or different:
n is 2 or 3; and
G is a direct link or alkylene up to $C_{20}$ or arylene said aryl-ether polymer being derived from a corresponding polymer carrying a plurality of groups $SO_2Z$, where Z is halogen, and possibly also groups $SO_2OM$, where M is 1/m of a cation of valency m, and being characterized in that said aryl-ether polymer contains, by moles, 0 to 10% of groups $SO_2OM$ based on the total groups $SO_2OM$ and $SO_2N(R''')-G-N-R_n''''$.

3. A polymer according to claim 1 to claim 2 which contains repeating units of formula I:

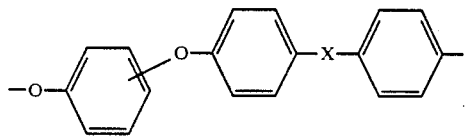

where X is $SO_2$ or CO or partly $SO_2$, partly CO, at least 85% of sub-units III

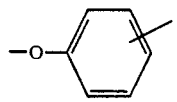 III carrying at least one sulphonamide group $SO_2NR'R''$ or $SO_2N(R''')-G-NR_n''''$.

4. A polymer according to claim 3 containing also units II:

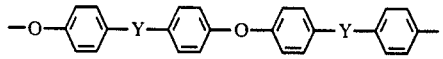

where Y is $SO_2$ or CO or partly $SO_2$, partly CO.

5. An aryl-ether polymer having aromatic rings linked to neighbouring rings in its chain through O and/or a direct link, at least some of said aromatic rings carrying a nuclear substituent sulphonamide group $SO_2NR'R''$, where R' is an aliphatic unsubstituted or substituted hydrocarbon group and R'' is hydrogen or an unsubstituted or substituted aliphatic hydrocarbon group, said neighbouring rings being part of repeating units Ph X Ph, where Ph is paraphenylene and X is $SO_2$ and/or CO, and being present in a molar proportion at least equal to that of said aromatic rings, said aryl-ether polymer being derived from a corresponding polymer carrying a plurality of groups $SO_2Z$, where Z is halogen, and possibly also groups $SO_2OM$, where M is 1/m of a cation of valency m, and being characterized in that the aryl-ether polymer contains, by moles, 0 to 5% of groups $SO_2OM$ based on the total groups $SO_2OM$ and $SO_2NR'R''$.

6. An aryl-ether polymer having aromatic rings linked to neighbouring rings in its chain through O, or direct link, at least some of said aromatic rings carrying a nuclear substituent sulphonamide group $SO_2N(R''')-G-N-R_n''''$ where
R'''' and R''''' are hydrogen or unsubstituted or substituted hydrocarbon and may be the same or different:
n is 2 or 3; and
G is a direct link or alkylene up to $C_{20}$ or arylene said aryl-ether polymer being derived from a corresponding polymer carrying a plurality of groups $SO_2Z$, where Z is halogen, and possibly also groups $SO_2OM$, where M is 1/m of a cation of valency m, and being characterized in that said aryl-ether polymer contains, by moles, 0 to 5% of groups $SO_2OM$ based on the total groups $SO_2OM$ and $SO_2N(R''')-G-N-R''''$.

7. An aryl-ether polymer having aromatic rings linked to neighbouring rings in its chain through O and/or a direct link, said neighbouring rings being part of repeating units Ph X Ph, where Ph is paraphenylene and X is $SO_2$ and/or CO, and being present in a molar proportion at least equal to that of said aromatic rings, at least some of said aromatic rings carrying a plurality of groups $SO_2Z$, where Z is halogen or NR'R'', where R' is an aliphatic unsubstituted or substituted hydrocarbon group and R'' is hydrogen or an unsubstituted or substituted aliphatic hydrocarbon group, and possibly also groups $SO_2OM$, where M is 1/m of a cation of valency m, characterized in that, by moles, the groups $SO_2Z$ are at least 90% of the total of groups $SO_2Z$ and $SO_2OM$.

8. An aryl-ether polymer having aromatic rings linked to neighbouring rings in its chain through O and/or a direct link, said neighbouring rings being part of repeating units Ph X Ph, where Ph is paraphenylene and X is $SO_2$ and/or CO, and being present in a molar proportion at least equal to that of said aromatic rings, at least some of said aromatic rings carrying a plurality of groups $SO_2Z$, where Z is halogen or NR'R'', where R' is an aliphatic unsubstituted or substituted hydrocarbon group and R'' is hydrogen or an unsubstituted or a substituted aliphatic hydrocarbon group, and possibly also groups $SO_2OM$, where M is 1/m of a cation of valency m, characterised in that, by moles, the groups $SO_2Z$ are at least 95% of the total of groups $SO_2Z$ and $SO_2OM$.

9. A polymer according to claims 7 or 8 carrying a plurality of groups $SO_2Z$, where Z is halogen, characterized in that the polymer is soluble in tetrachloroethane.

10. A process for making an aryl-ether polymer carrying a plurality of groups $SO_2Z'$, where Z' is halogen, the aryl-ether polymer having aromatic rings linked to neighbouring rings in its chain through O and/or a direct link, said neighbouring rings being part of repeating units Ph X Ph, where Ph is paraphenylene and X is $SO_2$ and/or CO, and being present in a molar proportion at least equal to that of said aromatic rings, the process comprising reacting a corresponding polymer carrying groups $SO_2OM$ with an inorganic halide and working up the product of that reaction by contact with a liquid, and is characterized by maintaining substantially anhydrous conditions during working up.

11. A process according to claim 10 in which the reaction takes place in presence of a weak tertiary organic base.

12. A process according to claim 11 which comprises contacting the reaction mixture with an alcohol and then with a volatile hydrocarbon.

13. A process of producing purified water which comprises contacting water containing dissolved impurity with one side of a cationic sulphonamide substituted polymer according to claim 1 applying to the impurity-containing water a hydrostatic pressure in excess of the osmotic pressure of that solution, and recovering purified water from the other side of that membrane.

14. A process according to claim 12 in which the reaction mixture is contacted with the alcohol with vigorous agitation whereby residue weak base used as a catalyst for producing the desired sulphonyl halide is prevented from catalysing hydrolysis of said sulphonyl halide.

15. A membrane comprising at least one polymer according to any one of claims 1 to 6 suitable for separation technologies, selected from the group consisting of ion-exchange, reverse osmosis and ultrafiltration.

* * * * *